Figure 1:
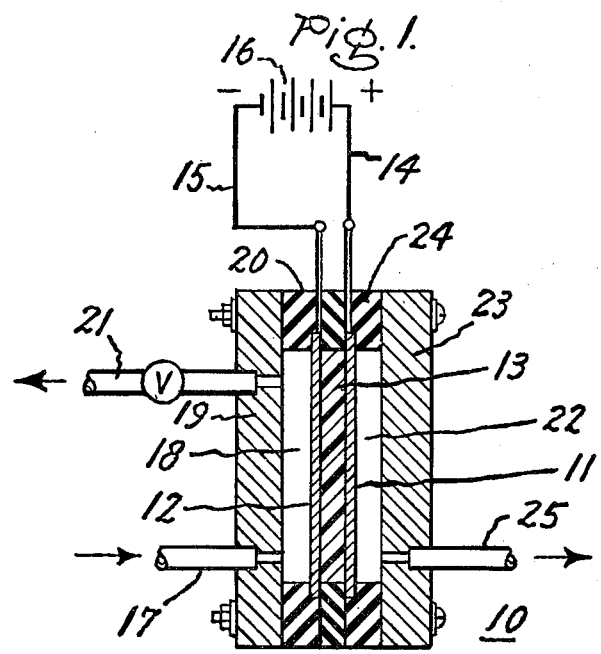

United States Patent [19]

Danzig et al.

[11] 3,992,271
[45] Nov. 16, 1976

[54] METHOD FOR GAS GENERATION

[75] Inventors: Ivan F. Danzig, North Quincy; Anthony B. La Conti, Lynnfield; Joseph M. Amore, Danvers, all of Mass.

[73] Assignee: General Electric Company, Wilmington, Mass.

[22] Filed: Mar. 3, 1975

[21] Appl. No.: 554,428

Related U.S. Application Data

[63] Continuation of Ser. No. 334,196, Feb. 21, 1973, abandoned, which is a continuation of Ser. No. 112,891, Feb. 5, 1971, abandoned.

[52] U.S. Cl. .................................. 204/129; 204/293
[51] Int. Cl.² ...................... C25B 1/04; C25B 11/06
[58] Field of Search ........................... 204/129, 293

[56] References Cited
UNITED STATES PATENTS 3,489,670  1/1970  Maget .................................. 204/129

*Primary Examiner*—R. L. Andrews

[57] ABSTRACT

A gas generation apparatus which is useful for the concentration of oxygen or for the generation of oxygen and hydrogen by electrolysis has a catalytic cathode, an improved catalytic anode with a catalyst selected from platinum-iridium alloys containing 5 to 50 per cent iridium, a cation-exchange membrane positioned between and in electrical contact with the cathode and anode, means for providing a direct current potential between the cathode and the anode, and outlet means for removing gas from at least one of the electrodes. Methods are described for the concentration of oxygen and for generation of oxygen and hydrogen by electrolysis.

4 Claims, 2 Drawing Figures

METHOD FOR GAS GENERATION

This is a continuation of application Ser. No. 334,196, filed Feb. 21, 1973 which is a continuation of Ser. No. 112,891, filed Feb. 5, 1971 both now abandoned.

This invention relates to methods and apparatus for the generation of gases. More particularly, it relates to methods and apparatus for the concentration of oxygen, and for the generation of oxygen and hydrogen by electrolysis.

The use of fuel cells for generating electrical energy has been described in the prior art. Such cells take a variety of forms, but generally include a catalytic anode, an adjacent electrolyte which is in electrical contact with the anode, and a catalytic cathode, also adjacent the electrolyte and in electrical contact with it but opposite the anode. When reactants are supplied to the two electrodes, for example, hydrogen to the anode and oxygen to the cathode, electrical energy is generated between the two electrodes and a by-product, water, is formed. Such a fuel cell is described and claimed in U.S. Pat. No. 3,297,484 entitled "Electrode Structure and Fuel Cell Incorporating the Same" which issued on Jan. 10, 1967 in the name of Leonard W. Niedrach and is assigned to the same assignee as the present application. Iridium is included as one of the gas adsorbing metals useable as an electrode catalyst.

As fuel cell technology grew and became more sophisticated, use of hydrocarbon fuels or hydrogen fuels produced from hydrocarbons by processes such as steam reforming became increasingly attractive from cost and other standpoints. The fuel in systems of this type, however, inevitably contain substantial amounts of oxygenated carbons such as carbon monoxide which are products of partial oxidation of the hydrocarbons. Contaminants such as carbon monoxide are adsorbed over the surface area of the catalyst thereby gradually "poisoning" the catalyst and reducing the amount of uncontaminated surface area remaining to convert the fuel to the ion form for transport through the electrolyte. As a result, the output of the cell is progressively reduced and eventually it becomes inoperative.

It was then discovered that the problems associated with "poisoning" of the catalytic electrode by carbon monoxide or carbon fuel contaminants could be reduced by utilizing iridium or platinum-iridium alloy catalyst in place of platinum. The iridium and platinum-iridium catalysts provided substantially greater surface areas than platinum for a given catalyst loading (mg/cm$^2$), for example. With the increased catalyst surface area, the effects of catalyst "poisoning" could be substantially ameliorated and acceptable performance of the fuel cell in a carbon monoxide contaminated environment or the like could be achieved.

U.S. Pat. No. 3,291,753 issued Dec. 13, 1966 described one catalyst preparation including a catalyst of platinum-iridium to an existing electrode or as a component in an electrode in an electrochemical cell for the direct production of electrical energy in which hydrogen containing organic compounds such as propane, ethane, isobutane, etc. are utilized as fuels. The catalyst described in this patent includes finely divided carbon with a coating of platinum-iridium alloy containing 6.6 weight percent of iridium which coated carbon can be mixed with tetrafluoroethylene polymer and a filler. The filler is leached and the resulting structure is described as an anode in a fuel cell.

Similarly, French Pat. No. 1,407,903 issued June 28, 1965, is directed to a fuel cell utilizing hydrocarbn fuels such as methanol and utilizes a catalyst as described in Table 6 on page 7 which includes a 75% platinum and 25% iridium.

In copending patent application Ser. No. 582,595 entitled "Platinum-Iridium Alloy Fuel Cell Electrocatalysis" filed Sept. 28, 1966 in the names of Leonard W. Niedrach and Douglas W. McKee, there is disclosed and claimed a fuel cell operated on a carbon monoxide contaminated fuel and a process for generating electrical energy by the electrochemical oxidation of a carbon monoxide fuel wherein the anode contains an electrocatalyst consisting essentially of from 10 to 85 percent by weight iridium and the balance of platinum. This copending application is assigned to the assignee of the present application.

The iridium and platinum-iridium fuel cell electrode catalysts were, however, used only where the reactants contained carbon monoxide or carbon fuel contaminants since it was found that there was no advantage in terms of performance over platinum catalysts if the reactants were free of carbon monoxide or other carbon species. In fact, iridium and platinum-iridium electrode catalysts were not considered useful where the fuel cell reactants were free from carbon monoxide, etc. because they not only did not improve performance over the better known platinum catalysts, but also there was a substantial cost penalty associated with their use. First, the raw material cost is higher since iridium is more expensive than platinum. Secondly, fabrication of platinum-iridium alloys is complex and difficult involving, for example, such processes as the modified Adams process in which the alloy is prepared by thermally decomposing mixed metal salts. Hence, the overall cost of using these alloys as catalysts in place of platinum was by no means insubstantial. The fuel cell technology, therefore, postulates that the cost and complexity penalties associated with the use of iridium or platinum-iridium catalysts is warranted only where the reactants are contaminated by carbon monoxide or carbon species since only then is there any benefit derived from their use. Thus, it was understood and accepted that in a pure $H_2 - O_2$ or air environment the use of these catalysts over platinum is not justified, but is in fact, contra-indicated, because there is no improvement in performance and there is a substantial penalty in terms of cost and complexity.

It can thus be seen that the choice of a catalyst in an electrochemical cell depends on a complex set of variables such as surface area of the catalyst, availability of oxided species on the catalyst surface, contaminants in the reactants, etc. and the nature of the conversion taking place. Consequently, it is and always has been difficult to predict the applicability of a catalyst in a different electrochemical system. For example, if a cell assembly, which is similar in a good many respects to a fuel cell in that two catalytic electrodes are positioned adjacent to an ion transporting electrolyte, has an external source of electrical energy applied to the electrodes, the cell becomes a gas generating apparatus. That is, if a gas or water is supplied to one or both of the catalytic electrodes, dissociation of the gas or electrolysis of the water will take place. Such an apparatus is therefore, a gas generation apparatus which is useful in the concentration of oxygen or in the generation of oxygen and hydrogen by electrolysis. For example, utilizing the driving force of an applied potential, the permselective nature of an ion-exchange-membrane electrolyte and supplying an oxygen oxidant to the cathode, an ionic product may be caused to pass through the electrolyte to the opposite electrode (anode) where a molecular product is formed. When an oxygen oxidant such as air or inpure oxygen is fed to the cathode of such an apparatus, pure oxygen gas is concentrated at the anode.

Since the gas concentrating and electrolysis cells both utilize catalytic electrodes, the performance of the catalysts at the gas evolving electrodes depends on a set of complex, highly unpredictable variables. We have now discovered that platinum-iridium catalysts surprisingly provide noticeably improved performance over platinum as catalytic gas evolving electrodes in oxygen concentrating and in electrolysis cells even though there are no perceptible amounts of carbon monoxide or other carbon fuels present. That is contrary to what was known in the fuel cell art, we have found that the use of platinum-iridium catalysts provide improved performance with no carbon monoxide or other carbon fuel contaminants present.

Thus, while the prior art, as exemplified by the previously cited patents, and the above-mentioned copending application describe platinum-iridium electrodes in fuel cells, they describe them only in connection with carbon monoxide or carbon fuel contaminated reactants. There is no description or teaching employing such catalysts in a gas generating apparatus used as an oxygen concentration or an electrolysis device which operate in an uncontaminated environment. Nor is the improved performance of this catalyst predictable from fuel cell data since fuel cell experience showed that, to the contrary, there was no difference in performance if the reactants supplied to the fuel cell electrodes were free of carbon monoxide or carbon fuel contamination.

The primary object of our invention is to provide an improved method of gas generation.

A further object of our invention is to provide an improved gas generation apparatus in which to concentrate oxygen or to produce oxygen and hydrogen by electrolysis.

In accordance with one aspect of our invention, a gas generation apparatus comprises a catalytic cathode, an improved catalytic anode with a catalyst consisting of platinum-iridium alloys containing 5 to 50 weight percent iridium, a cation exchange membrane positioned between and in electrical contact with the cathode and anode, means for providing a direct current potential between the cathode and the anode, and outlet means for removing gas from at least one of the electrodes.

Figure 2:
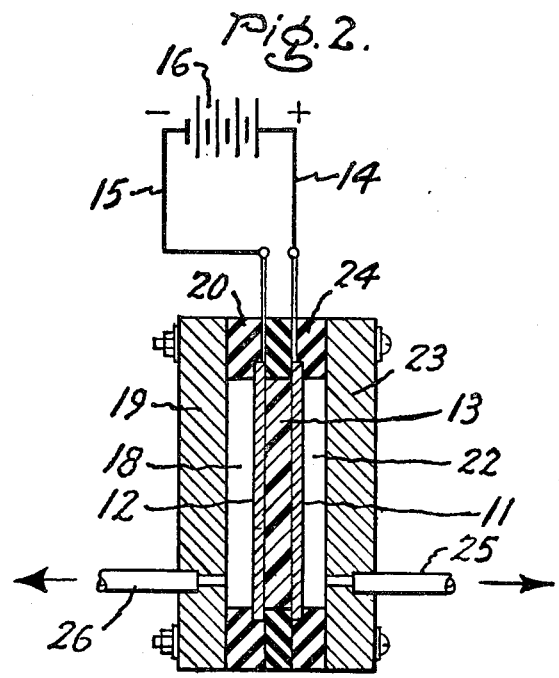

These and various other objects, features and advantages of the invention will be better understood from the following description taken in connection with the accompanying drawing in which:

FIG. 1 is a sectional view of gas generation apparatus in the form of an oxygen concentrator made in accordance with our invention; and FIG. 2 is a sectional view of a modified gas generation apparatus for the production of oxygen and hydrogen made in accordance with our invention.

In FIG. 1 of the drawing, there is shown generally at 10 a gas generation apparatus in the form of an oxygen concentrator embodying our invention. Apparatus 10 is shown with a catalytic anode 11, a catalytic cathode 12 and an ion-exchange-memebrane 13 positioned between and in electrical contact with anode 11 and cathode 12. A pair of electrical leads 14 and 15 are connected to electrodes 11 and 12 respectively. An external power source 16 which is shown in the form of a battery is connected to the opposite ends of leads 14 and 15. An oxygen oxidant, such as air or impure oxygen (neither of which contain any carbon monoxide or carbon fuel contaminants) is supplied to cathode 12 through an inlet 17 and chamber 18 formed by end plate 19, gasket 20 and electrode 12. A valved outlet 21 is provided from chamber 18 for exhausting impurities. A chamber 22 is formed by electrode 11, end plate 23 and gasket 24. The concentrated oxygen provided to chamber 22 is supplied through a suitable outlet 25 for consumption or storage.

Various catalytic cathode materials, and ion-exchange-membranes are known. Reference is made to such materials, their preparations and properties in the above-mentioned U.S. Pat. No. 3,297,484 which is hereby incorporated by reference in this application.

The improved catalytic anode of the present invention employs a catalyst of platinum-iridium alloy containing 5 to 50 weight percent iridium. Such an anode can be prepared by the most widely used method of alloying metals by thermally decomposing mixed metal salts. This is the technique which we consider to be most suitable for the preparation of platinum-iridium alloys. The preferred manner of preparation is by modifying the Adams method of platinum preparation by the inclusion of a thermally decomposable iridium halide, such as iridium chloride. The Adams method of platinum preparation is disclosed by R. Adams and R. L. Schriner in the *Journal of the American Chemical Society* at volume 45, page 2171, published in 1923. We have found it convenient to mix the finely divided halide salts of platinum and iridium in the same weight ratio of platinum and iridium desired in the final alloy. An excess of sodium nitrate is incorporated and the mixture fused in a silica dish at 500° C for 3 hours. The residue is then washed thoroughly to remove the nitrates and halides present. The resulting suspension of mixed oxides is reduced at room temperature by bubbling hydrogen therethrough or by using an electrochemical reduction technique. The product is dried thoroughly, as by the use of a heat lamp, ground and sieved through a 400 mesh nylon screen.

In the operation of the oxygen concentrator shown in FIG. 1, air or impure oxygen (both of which are free of CO or carbon fuel contaminants) is supplied through inlet 17 and chamber 18 to cathode 12. Valved outlet 21 is provided to exhaust impurities and other gases from chamber 18. A direct current potential is applied across cathode 12 and anode 11 from battery 16 to concentrate the oxygen which collects initially in chamber 22 and is removed therefrom through outlet 25.

In FIG. 2 of the drawing, there is shown a gas generation apparatus in the form of an electrolysis cell. The same numbers as in FIG. 1 have been used to show similar parts in FIG. 2. In this cell, oxygen chamber 22 communicates with oxygen outlet 25 while hydrogen chamber 18 communicates with hydrogen outlet 26.

In the operation of the electrolysis cell of FIG. 2, a direct current potential is applied across anode 11 and cathode 12 from battery 16 to produce oxygen and hydrogen at their respective electrodes. The hydrogen in chamber 18 is removed through outlet 26 while oxygen in chamber 22 is removed through outlet 25.

In the oxygen concentrator of FIG. 1 air or impure oxygen is furnished to the cathode. With a cation exchange membrane employed between the electrodes, hydrogen ions are conducted through the membrane from the oxygen-output side to the oxygen-input side. Water migrates through the electrolyte from the oxygen output side to the oxygen input side with the hydrogen ions. However, as water does not back diffuse rapidly enough from the oxygen-input side to the oxygen output side to replenish water at the anode which is either dissociated or migrates with the hydrogen ions, an additional water supply would be required. This is most easily accomplished by supplying water to the oxygen output side by flooding the anode chamber or through use of wicking. The reactions are:

At the cathode $$\tfrac{1}{2} O_2 + 2H^+ + 2e^- \rightarrow H_2O$$

At the anode $$H_2O \rightarrow \tfrac{1}{2} O_2 + 2H^+ + 2e^-$$

There is advantage in utilizing a cation exchange membrane for oxygen concentration in that the carbon dioxide picked up from the air is minimized.

In the electrolysis cell of FIG. 2, no gases are supplied to the apparatus but a direct current potential is applied across the anode and the cathode from the battery. Hydrogen gas is produced at the cathode while oxygen gas is produced at the anode. With a cation exchange membrane, the reactions are:

At the anode $$H_2O \rightarrow \tfrac{1}{2} O_2 + 2H^+ + 2e^-$$

At the cathode $$2H^+ + 2e^- \rightarrow H_2$$

In the electrolysis cell the water required to produce hydrogen and oxygen by dissociation at the anode is supplied to the anode by flooding the anode chamber or through the use of wicking. This mode of water supply is preferable to a cathode water feed.

We found that we can form a gas generation apparatus with an improved catalytic anode which device provides superior performance in oxygen concentration and in the generation of oxygen and hydrogen by electrolysis. While iridium and platinum-iridium catalysts for electrodes have been used in fuel cells as described above to ameliorate the effects of carbon monoxide or carbon fuel "poisoning" of the catalyst, the use of such catalysts as anode electrodes in a gas generation apparatus or in methods for concentrating oxygen or generating oxygen and hydrogen by electrolysis, both of which are systems not subject to carbon monoxide or carbon fuel contamination, are not shown or taught by the prior art. Further, our apparatus and methods are not predictable from fuel cell oxidation data, and are, in fact, contra-indicated. We found that, surprisingly, platinum-iridium alloys with 5 to 50 weight percent as the anode catalyst produce a gas generation apparatus wherein a reduced voltage can be employed thereby resulting in lower wattage during usage and in reduction of the device's weight.

To illustrate the diverse nature of the operation characteristics of the same catalysts in the different systems and hence, the lack of predictability as to usefulness and performance, a number of tests were carried out to show that there was no way of predicting the superior performance of platinum-iridium catalysts over platinum in oxygen concentrating and electrolysis systems from the performance of such catalysts in fuel cell systems. Fuel cells were constructed using both platinum and platinum-iridium as the catalytic electrodes. Both the anode and cathode performances of the fuel cells were tested by supplying commercial grade pure hydrogen and commercial grade pure oxygen to the anode and cathodes, respectfully, and measuring the cell potential (IR Free) in volts for various levels of current density (in amps per square foot A/ft$^2$) for platinum and platinum-iridium electrodes. The performance of the fuel cells is shown in Tables I and II below:

TABLE I

I.R. Free (V) Anode Performance on $H_2$ at 80° C vs. Pt/$H_2$ Reference Electrode

| Current Density (A/Ft$^2$) | Platinum (4 mg/cm$^2$) | Pt-5 IR (4 mg/cm$^2$) |
|---|---|---|
| 0 | 0.000 | 0.000 |
| 20 | 0.004 | 0.003 |
| 40 | 0.005 | 0.005 |
| 60 | 0.007 | 0.007 |
| 80 | 0.008 | 0.008 |
| 100 | 0.008 | 0.009 |

TABLE II

I.R.-Free (V) Cathode Performance of $O_2$ at 80° C vs. Pt/$H_2$ Reference Electrode

| Current Density A/Ft$^2$ | Pt (4 mg/cm$^2$) | Pt-5 Ir (4 mg/cm$^2$) | Pt-50 Ir (8 mg/cm$^2$) |
|---|---|---|---|
| 0 | | | |
| 40 | 0.925 | 0.924 | 0.877 |
| 80 | 0.896 | 0.888 | 0.820 |
| 100 | 0.889 | 0.879 | 0.800 |
| 120 | 0.880 | 0.865 | 0.779 |

It is plainly evident from Tables I and II that the performance of the catalysts as fuel cell anodes if essentially the same for platinum and platinum-iridium when pure hydrogen is used. The performance as a fuel cell cathode operating on pure $O_2$ is, in actuality, worse as the iridium concentration is increased to 50% iridium even though the loading is doubled from 4 milligrams/cm$^2$. Hence, the use of a platinum-iridium catalyst in a different electrochemical system such as a concentrator or electrolysis unit to obtain better performance than that possible with a platinum catlayst is not predictable from fuel cell data which shows merely that the more expensive platinum-iridium catalyst shows no superiority to platinum.

We achieve superior performance with an oxygen concentrator as shown in FIG. 1 and described above which employs a platinum-iridium alloy with only 5 weight percent iridium as the anode catalyst as opposed to a similar oxygen concentrator which employs platinum as the anode. The catalytic cathode contains a platinum catalyst and the electrolyte is a cation exchange membrane. The oxygen concentrator was operated at a temperature of 50° F. The similar oxygen concentrator employed the same catalytic cathode, membrane and operating temperature but utilized a catalytic anode having a platinum catalyst. In each concentrator, the cathode and the anode each contained four milligrams of catalyst per square centimeter. Atmospheric air was supplied to the anode of each concentrator. The performance of the above concentrators is shown below in Table I wherein cell potential (IR Free) in volts and current desnity in amperes per square foot are set forth.

TABLE I

Oxygen Concentrator with
Anode Catalyst of Pt-5% Ir

| Cell Potential (IR-Free) - Volts | Current Density - Amps/Ft² |
|---|---|
| 0.87 | 20 |
| 0.94 | 40 |
| 1.0 | 60 |
| 1.03 | 80 |
| 1.08 | 100 |
| 1.12 | 120 |

Oxygen Concentrator with
Anode Catalyst of Platinum

| Cell Potential (IR-Free) - Volts | Current Density - Amps/Ft² |
|---|---|
| 0.96 | 20 |
| 1.05 | 40 |
| 1.11 | 60 |
| 1.14 | 80 |
| 1.21 | 100 |
| 1.26 | 120 |

Similar superior performance is exhibited by our electrolysis cell as shown in FIG. 2 and described above employing a catalytic anode with a platinum 5 weight percent iridium catalyst as opposed to a platinum catalyst. The cells were as described above for the oxygen concentrator except that no gases were supplied to the device. Such performance is shown below in Table II wherein cell potential (IR Free) in volts and current density in amperes per square foot are set forth.

TABLE II

Electrolysis Cell with
Anode Catalyst of Pt-5% Ir

| Cell Potential (IR-Free) - Volts | Current Density - Amps/Ft² |
|---|---|
| 1.45 | 40 |
| 1.47 | 80 |
| 1.50 | 160 |
| 1.51 | 240 |
| 1.52 | 320 |
| 1.53 | 400 |

Electrolysis Cell with
Anode Catalyst of Platinum

| Cell Potential (IR-Free) Volts | Current Density - Amps/Ft² |
|---|---|
| 1.65 | 40 |
| 1.70 | 80 |
| 1.72 | 160 |
| 1.75 | 240 |
| 1.77 | 320 |
| 1.80 | 400 |

Examples of oxygen concentrators and electrolysis cells made in accordance with our invention are as follows:

EXAMPLE 1

The oxygen concentrators described above were compared on life test over a period of 240 hours. The current density was 70 ASF and the temperature was 50° F. The performance is shown below in Table III wherein the cell potential (IR Free) in volts of both concentrators and number of hours are shown.

TABLE III

| Concentrator I Pt-5% IR | Cell Potential (IR-Free) Volts Concentrator II Pt | Hours |
|---|---|---|
| 0.90 | 1.15 | 0 |

TABLE III-continued

| Concentrator I Pt-5% IR | Cell Potential (IR-Free) Volts Concentrator II Pt | Hours |
|---|---|---|
| 0.94 | 1.19 | 40 |
| 0.95 | 1.25 | 100 |
| 0.96 | 1.25 | 160 |
| 1.00 | 1.25 | 240 |

EXAMPLE 2

The electrolysis cell described above was compared on life test over 120 hours. The current density was 140 ASF and the temperature was 150° F. The performance is shown below in Table IV wherein the cell potential (IR-Free) in volts of both cells and the number of hours are shown.

TABLE IV

| Cell I Pt-5% IR | Cell Potential (IR-Free) Volts Cell II Pt | Hours |
|---|---|---|
| 1.55 | 1.85 | 0 |
| 1.59 | 1.85 | 30 |
| 1.62 | 1.85 | 50 |
| 1.64 | 1.85 | 120 |

It will be apparent from the above data that the performances of the platinum iridium catalysts is superior to that of platinum at all times during the life test both for the concentrator and the electrolysis cell. In fact, the performance of Pt-Ir is better at the end of its life test than that of the platinum at the initiation of the life test.

The improved performance of platinum-iridium anode catalyst requires at least 5 weight percent iridium in the catalyst. While the lower limit of platinum content was not fully determined, we were satisfied that platinum with 50% iridium appeared to provide the highest desirable content of iridium in the alloy. This was determined by forming and testing platinum-iridium alloys with 14% iridium and 50% iridium and 100% iridium catalysts.

EXAMPLES 3-5

Three electrolysis cells were constructed as above described in Ex. 1. The concentrators included anode catalysts of platinum — 14% iridium, iridium, and platinum — 50% iridium, respectively for Examples 3, 4 and 5. Life tests were conducted on each of the oxygen concentrators at 180° F. The performance is shown below in Table V for cells 3, 4 and 5 just prior to removal from life testing. The performance sets forth the example number, number of hours tested, the cell potential (IR-Free) in volts, and the current density in amperes per square foot.

TABLE V

| Example No. | Hours | Cell Potential (IR-Free) Volts | Current Density - Amps/Ft² |
|---|---|---|---|
| 3 | 161 | 1.64 | 150 |
| 4 | 67 | 1.67 | 150 |
| 5 | 4457 | 1.59 | 150 |

EXAMPLES 6–9

Four electrolysis cells were constructed as above described in Example 2 which contained anode catalysts of platinum, platinum — 5% iridium, platinum — 50% iridium and iridium identified respectively as Examples 6, 7, 8 and 9. The performance of these electrolysis cells set forth below in Table VI is at initial performance prior to a 1000 hour performance test. Cells 7, 8 and 9 which contain from some to all iridium provided superior performance to the cell of Example 6 which contained only a platinum anode catalyst. The current density of the cells set forth in Table VI is 100 amperes per square foot.

TABLE VI

| Example No. | Cell Potential (IR -Free) Volts | | | |
|---|---|---|---|---|
| | 80° F | 120° F | 150° F | 180° F |
| 6 | 1.940 | 1.858 | 1.795 | 1.725 |
| 7 | 1.622 | 1.564 | 1.534 | 1.492 |
| 8 | 1.546 | 1.514 | 1.472 | 1.454 |
| 9 | 1.575 | 1.532 | 1.508 | 1.478 |

EXAMPLES 10–13

Electrolysis cells in Examples 11–13 are the electrolysis cells of Examples 7–9 respectively, operated at a current density of 100 amperes per square foot for 1000 hours. The cell potential (IR-Free) is set forth in volts at the various temperatures tested.

TABLE VII

| Example No. | Cell Potential (IR -Free) Volts | | | |
|---|---|---|---|---|
| | 80° F | 120° F | 150° F | 180° F |
| 11 | 1.701 | 1.659 | 1.619 | 1.574 |
| 12 | 1.589 | 1.550 | 1.535 | 1.507 |
| 13 | 1.613 | 1.560 | 1.538 | 1.519 |

The performance at the end of the 1000 hours for all the iridium alloys was superior to that of platinum at the initiation of the life test for all these temperatures.

While other modifications of the invention and variations thereof which may be employed within the scope of the invention have not been described, the invention intended to include such as may be embraced within the following claims.

What we claim as new and desire to secure by Letters Patent of the United States is:

1. In an electrolytic method for generating hydrogen and oxygen comprising providing a catalytic cathode, providing a catalytic anode, positioning a cation exchange membrane positioned between and in electrical contact with the cathode and the anode, providing a direct current potential between the cathode and the anode, and generating simultaneously separate supplies of hydrogen and oxygen, the improvement in combination therewith of providing the anode with an oxygen evolution catalyst consisting of reduced platinum-iridium alloys comprising reduced 5 to 50 weight percent iridium.

2. In an electrolytic method as in claim 1, in which the catalyst is 5 weight percent iridium and the balance is platinum.

3. In a method for concentrating oxygen comprising providing a catalytic cathode, providing a catalytic anode, positioning a cation exchange membrane between and in electrical contact with the cathode and the anode, supplying an oxygen oxidant to the cathode, providing a direct current potential between the cathode and the anode, and concentrating oxygen at the anode, the improvement in combination therewith of providing the anode with a catalyst consisting of reduced platinum and iridium alloy comprising reduced 5 to 50 weight percent iridium.

4. In a method for generating oxygen as in claim 3, in which the catalyst is 5 weight percent iridium and the balance is platinum.

* * * * *